United States Patent
Bolger

[11] 3,828,392
[45] Aug. 13, 1974

[54] SWIVEL LOCKING CASTER BRAKE

[76] Inventor: Joseph Bolger, Summer St., Barre, Mass. 01005

[22] Filed: Aug. 23, 1972

[21] Appl. No.: 283,097

[52] U.S. Cl. ................................ 16/35 R, 16/18 R
[51] Int. Cl. ............................................ B60b 33/00
[58] Field of Search ............................. 16/35 R, 1 B

[56] References Cited
UNITED STATES PATENTS

| | | | |
|---|---|---|---|
| 2,068,160 | 1/1937 | Zeindler | 16/35 R |
| 2,345,442 | 3/1944 | Winter et al. | 16/35 R |
| 2,421,464 | 6/1947 | Reiner | 16/35 R |
| 2,709,828 | 6/1955 | Noelting et al. | 16/35 R |
| 2,905,275 | 9/1959 | Kostolecki et al. | 16/35 R |
| 2,951,258 | 9/1960 | Brooks et al. | 16/35 R |
| 3,409,105 | 11/1968 | Clinton | 16/35 R X |

FOREIGN PATENTS OR APPLICATIONS

| | | | |
|---|---|---|---|
| 1,052,780 | 12/1966 | England | 16/35 R |
| 357,634 | 11/1961 | Switzerland | 16/35 R |
| 839,272 | 6/1960 | England | 16/35 R |

Primary Examiner—Bobby R. Gay
Assistant Examiner—Peter A. Aschenbrenner
Attorney, Agent, or Firm—Charles R. Fay

[57] ABSTRACT

A swivel locking caster brake including a one-piece wheel brake and swivel lock constructed and arranged to apply the swivel lock separately prior to the application of the brake to the wheel.

1 Claim, 4 Drawing Figures

PATENTED AUG 13 1974

SWIVEL LOCKING CASTER BRAKE

BACKGROUND OF THE INVENTION

There have been many swivel locking caster brake constructions but in all cases the action of the lock and the brake are simultaneous or operated by two different members, and it is the general object of the present invention to provide a swivel lock caster brake operated by a single member which however locks the swivel separately without locking the brake so that the wheeled object may still be moved but with the swivels locked, and further motion of the operating member then applies the brake to lock the wheel as well as the swivel.

SUMMARY OF THE INVENTION

A swivel locking caster brake comprising a wheel, a hub, a caster housing, a swivel on the housing, a brake, and a lock operating lever mounted with respect to said hub and being adapted to move in one direction to move the locking mechanism applying the lock to the swivel and thereafter applying the brake to the wheel, the swivel lock being actuated first and the brake being actuated afterward.

PREFERRED EMBODIMENT OF THE INVENTION

Figure 4:
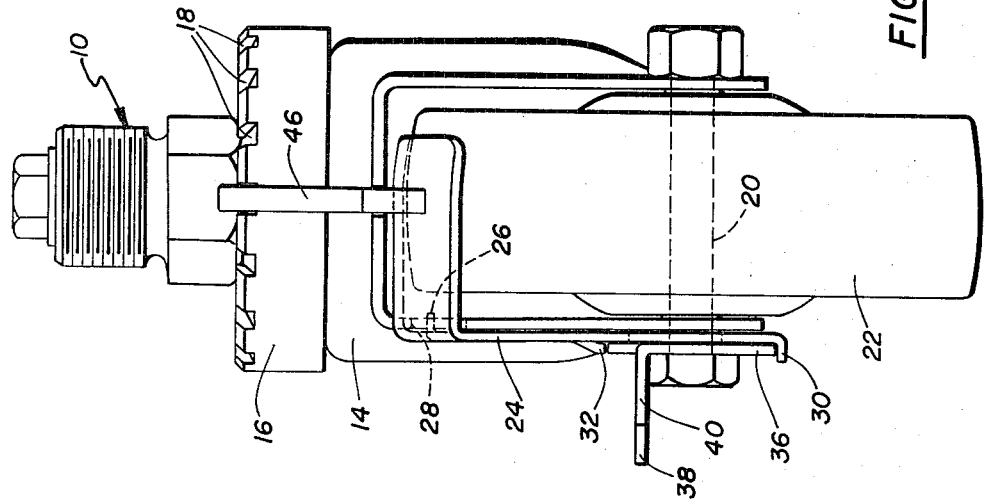
FIG. 4 is a view in front elevation of the caster looking in the direction of arrow 4 in FIG. 3.

A fastener, thread, or pin 10 provides a swivel for a generally U-shaped caster support 12 having a top portion 14 upon which is mounted a swivel plate 16. This swivel plate may be provided with bearings to swivel on the part 14 and it is also provided with an annular series of notches or indentations 18 mutually spaced about the periphery thereof.

The U-shaped caster support is provided with a hub or the like 20 having a shaft mounting a wheel 22 more or less in the usual manner and mounted to slide vertically thereon there is a brake support 24. This brake support has an inturned tip 26 working in a slot 28 in the U-shaped mount 12 to guide in vertically and adjacent the lower end thereof there is an outturned tip 30 and another one spaced therefrom at 32 encompassing the central cam hub 34 of lever 36, the latter having finger pieces 38, 40 thereon.

The cam hub 34 is eccentric with respect to the shaft hub 20 and acting like a cam, as it is moved in a clockwise direction it moves the tip 30 downwardly and therefore the brake support downwardly and therefore the brake shoe at 42 is likewise so moved.

In addition the brake shoe has mounted thereon a locking member generally indicated at 46, this locking member being rigid with respect thereto and of course therefore being moved up and down therewith.

Figure 1:
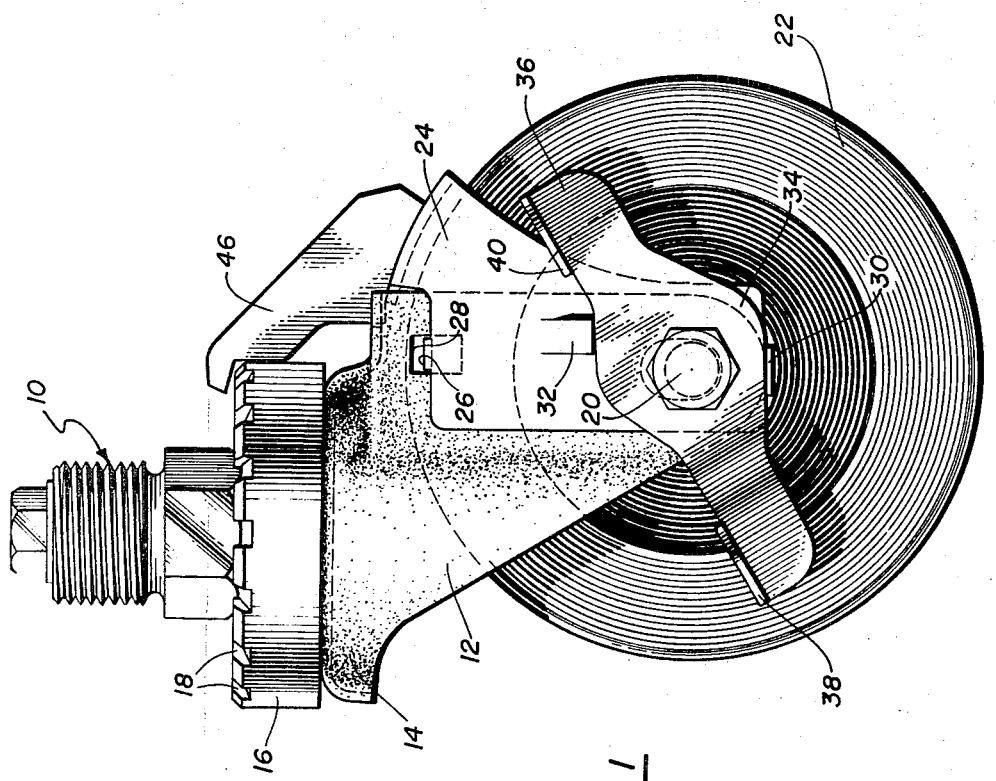
FIG. 1 is a view in side elevation illustrating the invention with the lock open and the brake free of the wheel.
Figure 3:
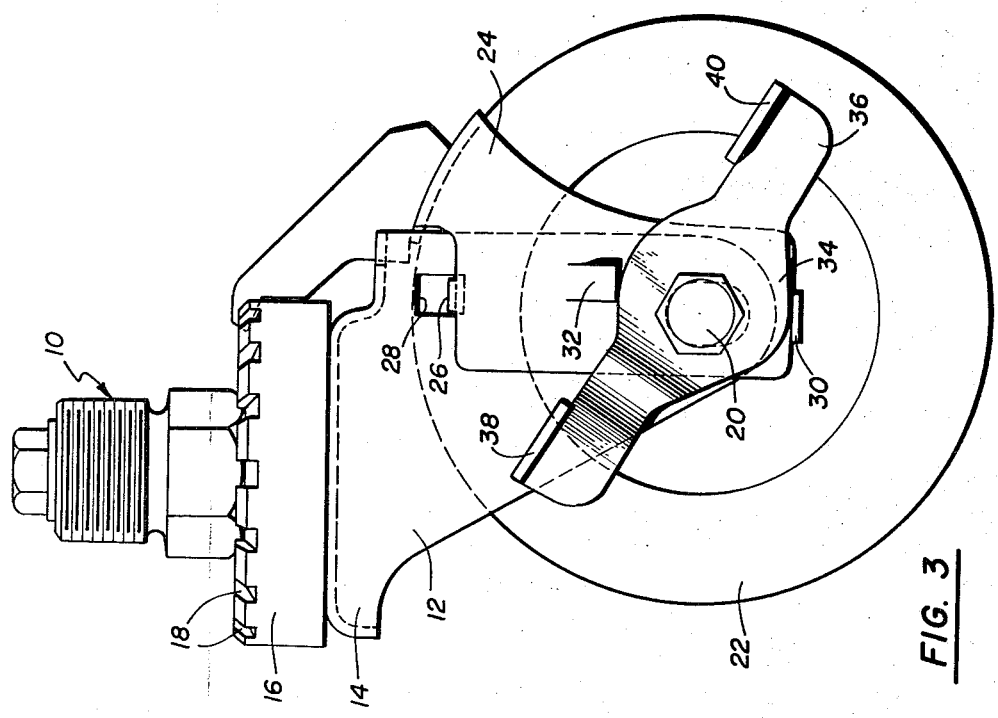
FIG. 3 illustrates the complete locked position wherein the brake is applied to the wheel, the swivel having been previously locked.
Figure 2:
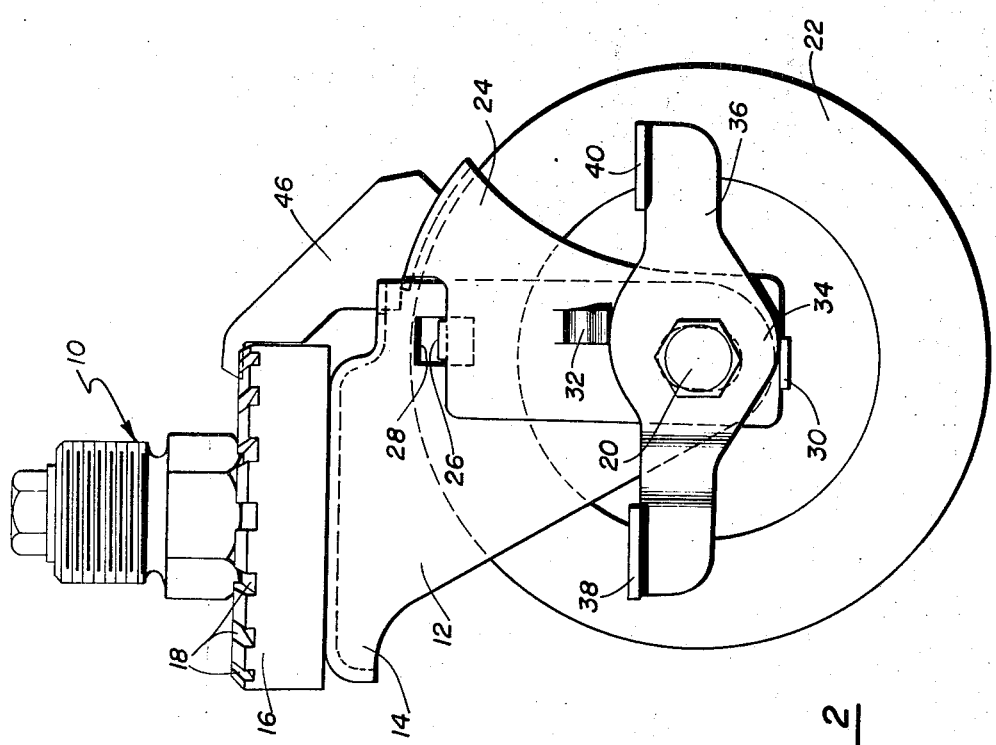
FIG. 2 is a like view illustrating the swivel lock engaged and the brake still free of the wheel.

As shown in FIG. 1 the lever 36 is in its position of greatest extent in a counterclockwise direction so that the brake shoe is free of the periphery of the wheel and the locking arm 46 is free of the swivel plate 16 and the notches therein. However, as shown in FIG. 2, with the lever 36 moved clockwise to a certain extent the locking lever 46 descends and engages in a notch 18 of the swivel plate locking the swivel, but nevertheless the brake shoe 42 is not in engagement with the periphery of the wheel. In this condition, the table, chair, or other object which is mounted on the center is free to move in the direction allowed by the locked wheels. That is, the wheels can rotate but the caster cannot swivel.

However with a further motion of the lever 36 in a clockwise direction the brake shoe will then engage the periphery of the wheel and lock it and at the same time the locking means 46 descends further down in its notch but with no further effect on the locking arrangement, but still maintaining its locking position; and in this case not only the swivel but also the wheel are held in rigid locked position.

I claim:

1. A swivel locking caster brake comprising a wheel, a wheel mount, a hub for the wheel on the wheel mount, a notched swivel plate mounted to swivel on the wheel mount,
   a brake, said brake being mounted for rectilinear motion on said wheel mount, a brake operating lever on the hub, said brake operating lever being constructed and arranged to move the brake into locking position with the periphery of the wheel and to disengage it therefrom,
   and a locking member fixed on the brake and being movable therewith, said locking member having a portion thereof engageable with a notch in the swivel plate, and being constructed and aranged to enter the notch to lock the swivel plate upon downward motion of the brake to a position just short of braking position against the periphery of the wheel, whereby the swivel is locked but the wheel is free to rotate,
   said brake and swivel lock being constructed and arranged to have a further motion under influence of said lever to a position braking the wheel at the periphery thereof while maintaining the lock with respect to the swivel, the locking member moving further into its notch without affecting the locking of the caster.

\* \* \* \* \*